United States Patent
Lee et al.

(10) Patent No.: US 9,571,184 B2
(45) Date of Patent: Feb. 14, 2017

(54) DIGITAL UNIT, SIGNAL PROCESSING SYSTEM, AND SIGNAL PROCESSING METHOD

(71) Applicant: KT CORPORATION, Gyeonggi-do (KR)

(72) Inventors: Ki-Ho Lee, Gyeonggi-do (KR); Yong-Gyoo Lee, Seoul (KR); Yung-Ha Ji, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 14/372,539

(22) PCT Filed: Nov. 6, 2012

(86) PCT No.: PCT/KR2012/009268
§ 371 (c)(1),
(2) Date: Jul. 16, 2014

(87) PCT Pub. No.: WO2013/108982
PCT Pub. Date: Jul. 25, 2013

(65) Prior Publication Data
US 2014/0357320 A1    Dec. 4, 2014

(30) Foreign Application Priority Data
Jan. 16, 2012  (KR) .......... 10-2012-0004979

(51) Int. Cl.
*H04W 16/26* (2009.01)
*H04B 7/26* (2006.01)
(Continued)

(52) U.S. Cl.
CPC ............ *H04B 7/2606* (2013.01); *H04B 7/026* (2013.01); *H04J 11/0053* (2013.01); *H04W 16/26* (2013.01); *H04W 88/08* (2013.01)

(58) Field of Classification Search
CPC ....... H04B 7/026; H04B 7/2606; H04W 88/08
(Continued)

(56) References Cited

U.S. PATENT DOCUMENTS

2010/0056170 A1*  3/2010  Lindoff ................ H04L 1/0026
                                                                    455/452.1
2010/0238821 A1   9/2010  Liu et al.
(Continued)

FOREIGN PATENT DOCUMENTS

KR       10-0903868 B1      6/2009
KR       10-2009-0101760 A  9/2009
(Continued)

OTHER PUBLICATIONS

Fujitsu, "CoMP Cell Set Configuration", R2-093075, 3GPP TSG-RAN WG2 Meeting #66, San Francisco, USA, May 4-8, 2009.
(Continued)

*Primary Examiner* — Nathan Taylor
(74) *Attorney, Agent, or Firm* — IP Legal Services, LLC

(57) ABSTRACT

A signal processing system and method are disclosed. The signal processing system includes a digital unit connected to a core system and a plurality of radio units physically isolated from the digital unit. The digital unit is configured to process radio digital signals. The plurality of radio units are configured to convert and amplify digital signals from the digital unit, to transmit the amplified signals to a terminal based on a multi-antenna technology using two antennas, and to receive the signals from the terminal and to transmit the same to the digital unit based on the multi-antenna technology using two antennas.

14 Claims, 8 Drawing Sheets

(51) Int. Cl.
*H04B 7/02* (2006.01)
*H04J 11/00* (2006.01)
*H04W 88/08* (2009.01)

(58) Field of Classification Search
USPC .................................................... 455/562.1
See application file for complete search history.

(56) References Cited

U.S. PATENT DOCUMENTS

| | | | | |
|---|---|---|---|---|
| 2011/0010768 | A1* | 1/2011 | Barriga | H04L 63/0428 |
| | | | | 726/11 |
| 2011/0170422 | A1* | 7/2011 | Hu | H04W 36/0055 |
| | | | | 370/242 |
| 2011/0176634 | A1* | 7/2011 | Yoon | H04L 5/0023 |
| | | | | 375/295 |
| 2011/0223962 | A1 | 9/2011 | Kuwahara et al. | |
| 2011/0235608 | A1* | 9/2011 | Koo | H04B 7/024 |
| | | | | 370/329 |
| 2012/0113951 | A1* | 5/2012 | Koo | H04L 5/0048 |
| | | | | 370/329 |
| 2012/0163202 | A1* | 6/2012 | Aguirre | H04L 41/12 |
| | | | | 370/252 |
| 2012/0275411 | A1* | 11/2012 | Kim | H04L 5/0032 |
| | | | | 370/329 |
| 2013/0156001 | A1* | 6/2013 | Gomadam | H04W 72/0406 |
| | | | | 370/330 |
| 2014/0029696 | A1* | 1/2014 | Yoon | H04L 5/0023 |
| | | | | 375/299 |
| 2014/0185573 | A1* | 7/2014 | Yoon | H04J 11/0053 |
| | | | | 370/329 |
| 2014/0355711 | A1* | 12/2014 | Yoon | H04L 5/0023 |
| | | | | 375/267 |

FOREIGN PATENT DOCUMENTS

| | | |
|---|---|---|
| KR | 10-2010-0065048 A | 6/2010 |
| KR | 10-2011-0084594 A | 7/2011 |
| KR | 10-2011-0132595 A | 12/2011 |

OTHER PUBLICATIONS

Ralf Irmer et al., "Coordinated Multipoint: Concepts, Performance, and Field Trial Results", IEEE Communications Magazine, Feb. 2011, vol. 49, No. 2, pp. 102-111.
Samsung, "Design Considerations for CoMP Joint Transmission", R1-093382, 3GPP TSG RAN WG1 Meeting #58, Shenzhen, China, Aug. 24-Aug. 28, 2009.

* cited by examiner

DIGITAL UNIT, SIGNAL PROCESSING SYSTEM, AND SIGNAL PROCESSING METHOD

CROSS REFERENCE TO RELATED APPLICATIONS

This application is a National Stage Patent Application of PCT International Patent Application No. PCT/KR2012/009268 (filed on Nov. 6, 2012) under 35 U.S.C. §371, which claims priority to Korean Patent Application No. 10-2012-0004979 (filed on Jan. 16, 2012), the teachings of which are incorporated herein in their entireties by reference.

TECHNICAL FIELD

The present invention relates to a digital unit, a signal processing system, and a signal processing method.

BACKGROUND ART

In general, a digital unit and a radio unit are installed together in a single physical system of a communication base station. However, such a design of the base station has limitations in cell design optimization because it requires installing a base station including both of a radio unit and a digital unit at each cell. To overcome such a limitation, a plurality of antennas is connected to single base station to form a cell as necessary and to reduce coverage holes.

Such configuration of the base station may enable efficient cell design but has a limitation to maximize system capacity. Accordingly, there is a demand to develop a new structure and a new transfer method for a base station to maximize radio capacity.

DISCLOSURE

Technical Problem

The present invention has been made in an effort to provide a digital unit, a signal processing system, and a signal processing method for maximizing the effect of diversity on a terminal located in a boundary region and maximizing the performance in the boundary region.

Technical Solution

An exemplary embodiment of the present invention provides a signal processing system including a digital unit and a plurality of radio units.

The digital unit may be connected to a core system and configured to process radio digital signals. The plurality of radio units may be physically isolated from the digital unit. The plurality of radio units may be configured to convert and amplify digital signals received from the digital unit, to transmit the amplified signals to a terminal based on a multi-antenna technology using two antennas, and to receive the signals from the terminal and to transmit the same to the digital unit based on the multi-antenna technology using two antennas.

If a first cell is adjacent to a second cell and if the first cell and the second cell are configured to use the same reference signal, a radio unit of the first cell and a radio unit of the second cell use the same resource element to transmit the same data to a terminal located in a boundary region of the first and second cells.

The resource element is a resource element other than that occupied by the reference signal used by the first and second cells, and the radio unit of the first cell and the radio unit of the second cell transmit data to the terminal through the same channel.

The difference between the physical cell identifier of the first cell and the physical cell identifier of the second cell is a multiple of three.

The radio unit of the first cell and the radio unit of the second cell transmit information on the strength of uplink signals from the terminal to the digital unit, and the digital unit determines whether the terminal is located in the boundary region based on the information on the signal strengths of signals transmitted from the radio unit of the first cell and the radio unit of the second cell.

If the difference between the signal strength of a signal transmitted from the radio unit of the first cell and the signal strength of a signal transmitted from the radio unit of the second cell is less than or equal to a threshold, or the ratio of the signal strengths has a value between a threshold for the ratio and the reciprocal of the threshold for the ratio, the digital signal processor determines that the terminal is located in the boundary region.

Another exemplary embodiment of the present invention provides a digital unit of processing radio signals transmitted from a plurality of radio units.

The digital unit is physically isolated from the plurality of radio units. Each one of the plurality of radio units is installed in a corresponding service area and is configured to send signals to and to receive signals from a terminal based on a multi-antenna technology using two antennas, The digital unit may include a receiver, a determiner, and a processor. The receiver may be configured to receive, from a terminal, information on strength of an uplink signal transmitted from a radio unit located in a first cell and information on strength of an uplink signal transmitted from a radio unit located in a second cell, wherein the first cell is adjacent to the second cell and the first cell and the second cell are configured to use the same reference signal;

The determiner may be configured to determine whether the terminal is located in a boundary region of the first and second cells, based on the received information on the signal strengths from the terminal.

The processor may be configured to control the radio unit of the first cell and the radio unit of the second cell to use the same resource element to transmit the same data to the terminal if the terminal is located in the boundary region of the first and second cells.

If the difference between the signal strength of a signal transmitted from the radio unit of the first cell and the signal strength of a signal transmitted from the radio unit of the second cell is less than or equal to a threshold, or if the ratio of the signal strengths has a value between a threshold for the ratio and the reciprocal of the threshold for the ratio, the determiner determines that the terminal is located in the boundary region.

The processor controls the radio unit of the first cell and the radio unit of the second cell to transmit the same data to the terminal through the same channel.

The first cell and the second cell use the same reference signal because the difference between the physical cell identifier of the first cell and the physical cell identifier of the second cell is a multiple of three.

The plurality of radio units transmit data signals using orthogonal frequency-division multiplexing (hereinafter, referred to as "OFDM") resources or wideband code division multiple access (WCDMA) resources.

Yet another exemplary embodiment of the present invention provides a method of processing signals from a plurality of radio units at a digital unit. The digital unit is physically isolated from the plurality of radio units. Each one of the plurality of radio units is installed in a corresponding service area and is configured to send signals to and to receive signals from a terminal based on a multi-antenna technology using two antennas.

The method may include determining whether the terminal is located in a boundary region of a first cell and a second cell, based on information on the signal strengths of signals transmitted from a radio unit located in the first cell and a radio unit located in the second cell, wherein the first cell is adjacent to the second cell and the first cell and the second cell are configured to use the same reference signal, and controlling the radio unit of the first cell and the radio unit of the second cell to use the same resource element to transmit the same data to the terminal if the terminal is determined as located in the boundary region of the first and second cells.

The determining includes receiving information on the strengths of uplink signals transmitted from the radio unit located in the first cell and transmitted from the radio unit located in the second cell, wherein the second cell is adjacent to the first cell and the first cell and the second cell are configured to use the same reference signal as the first cell, and determining that the terminal is located in the boundary region if the difference between the signal strength of a signal transmitted from the radio unit of the first cell and the signal strength of a signal transmitted from the radio unit of the second cell is less than or equal to a threshold, or the ratio of the signal strengths has a value between a threshold for the ratio and the reciprocal of the threshold for the ratio.

Advantageous Effects

According to the present invention, the same data is transmitted to a terminal located in a boundary region by using the same resource elements in neighboring cells. Accordingly, the performance in the boundary region may be maximized by maximizing the effect of diversity on the terminal in the boundary region.

MODE FOR INVENTION

Figure 1:
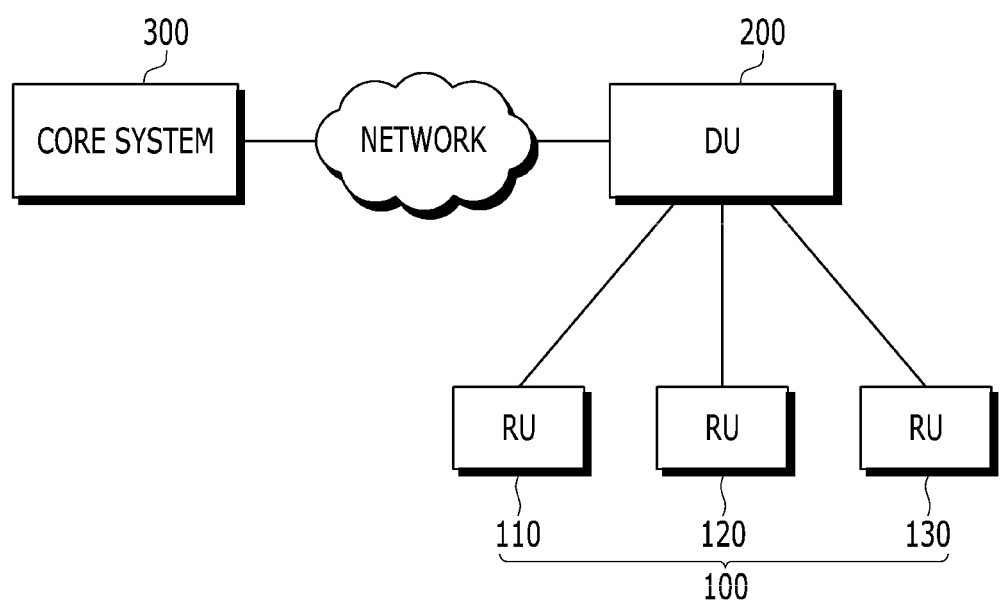
FIG. 1 is a schematic block diagram of a network according to an exemplary embodiment of the present invention.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification, unless explicitly described to the contrary, the word "comprise" and variations such as "comprises" or "comprising" will be understood to imply the inclusion of stated elements but not the exclusion of any other elements. In addition, the terms "-er", "-or" and "module" described in the specification mean units for processing at least one function and operation and can be implemented by hardware components or software components and combinations thereof.

In this specification, a terminal may designate a mobile station (MS), a mobile terminal (MT), a subscriber station (SS), a portable subscriber station (PSS), user equipment (UE), an access terminal (AT), etc., and may include all or some of the functions of the terminal, the mobile station, the mobile terminal, the subscriber station, the portable subscriber station, the user equipment, the access terminal, etc.

In this specification, a base station (BS) may designate an access point (AP), a radio access station (RAS), a node B (NodeB), an evolved NodeB (eNodeB), a base transceiver station (BTS), a mobile multihop relay (MMR)-BS, etc and include all or some of the functions of the access point, the radio access station, the NodeB, the eNodeB, the base transceiver station, the MMR-BS, etc.

Hereinafter, a signal processing system according to an exemplary embodiment of the present invention will be described in detail with reference to the accompanying drawings.

FIG. 1 is a schematic block diagram of a network according to an exemplary embodiment of the present invention.

Referring to FIG. 1, a network according to an exemplary embodiment of the present invention includes a radio unit (RU) 100, a digital unit (DU) 200, and a core system 300. The radio unit 100 and the digital unit 200 constitute a signal processing system for wireless communication.

The radio unit 100 is a part that processes radio signals. The radio unit 100 converts a digital signal received from the digital unit 200 into a radio frequency (RF) signal according to frequency bands and amplifies the RF signal. A plurality of radio units 100 (110, 120, and 130) are connected to the digital unit 200. Each of the radio units 100 is installed in a corresponding service area, i.e., cell. The radio units 100 and the digital unit 200 may be connected together with an optical cable.

The digital unit 200 encodes or decodes wireless digital signals. The digital unit 200 is connected to the core system 300. Unlike the radio unit 100 installed in a corresponding service area, the digital unit 200 is not installed in a corresponding service area. The digital unit 200 is centralized, as a server, in a central office with a switching system. In other words, the digital unit 200 is installed in a central office as a virtualized base station. The digital unit 200 sends signals to and receives signals from the plurality of radio units 100.

In a typical communication base station, processors corresponding to the radio units 100 and a processor corresponding to the digital unit 200 are installed together in a single physical system. Such a physical system is installed in each service area. Unlike the typical communication base station, the radio unit 100 and the digital unit 200 are physically separated and only the radio unit 100 is installed in a service area in accordance with at least one embodiment.

The core system 300 manages a connection between the digital unit 200 and an external network. The core system 300 includes an exchanger (not shown).

Now, a cell structure according to an exemplary embodiment of the present invention will be described in detail with reference to FIG. 2.

Figure 2:
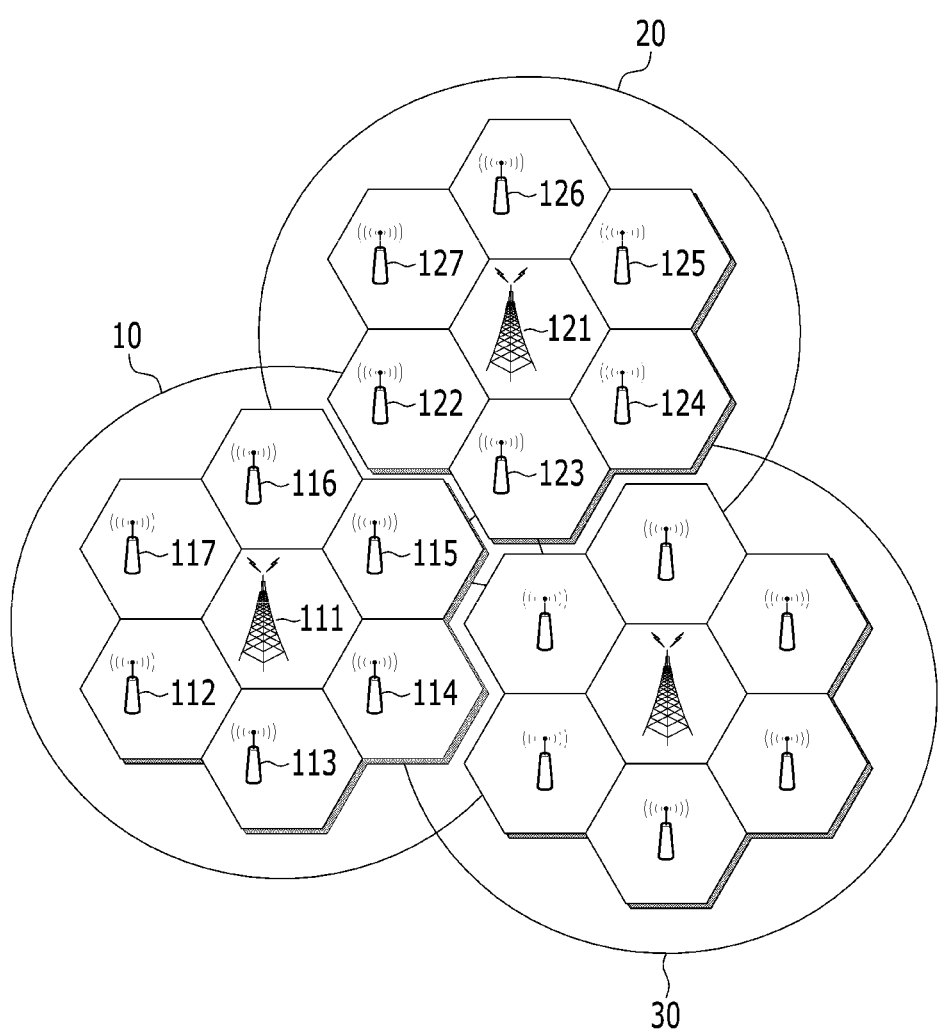
FIG. 2 illustrates cells according to an exemplary embodiment of the present invention.

FIG. 2 shows cells according to an exemplary embodiment of the present invention.

Referring to FIG. 2, each one of cells 10, 20, and 30 according to an exemplary embodiment of the present invention includes a plurality of radio units 100. Each one of the radio units 100 includes a macro radio unit (macro RU) 111 and 121 and a plurality of cooperative radio units (cooperative RUs) 112, 113, 114, 115, 116, 117, 122, 123, 124, 125, 126, and 127.

The macro radio units 111 and 121 are in charge of the main communication process between cells 10 and 20. The macro radio units 111 and 121 transmit signals to all terminals within the cells 10 and 20 at a high output power. The cooperative units 112 to 117 and 122 to 127 transmit signals to adjacent terminals at an output power lower than that of the macro radio units 111 and 121.

A single cell 10 includes at least one macro radio unit 111 and a plurality of cooperative radio units 112 to 117. All of the radio units 100 included the plurality of cells 10, 20, and 30 are under the control of the digital unit 200.

Radio signals transmitted to a terminal from the radio unit 100 include a control signal, a data signal, and a reference signal. The control signal is used to inform the terminal of basic system information and data channel allocation information. The data signal is used to transmit user data, and the reference signal is used for channel estimation.

A plurality of cooperative radio units 112 to 117 included in a cell 10 transmit a control signal and a reference signal, which are identical to a control signal and a reference signal transmitted from the macro radio unit 111 included in the same cell 10.

The radio units 100 included in different cells 10, 20, 30, transmit different control signals and different reference signals. For example, a reference signal transmitted by the radio units 111 to 117 included in the cell 10 is different from a reference signal transmitted by the radio units 121 to 127 included in the cell 20.

As described, a plurality of cooperative radio units 112 to 117 or 122 to 127 are installed in a cell as well as a macro radio unit 111 or 121. Accordingly, a terminal may effectively receive a control signal and a reference signal, which are commonly transmitted from a plurality of radio units in the same cell.

Figure 3:
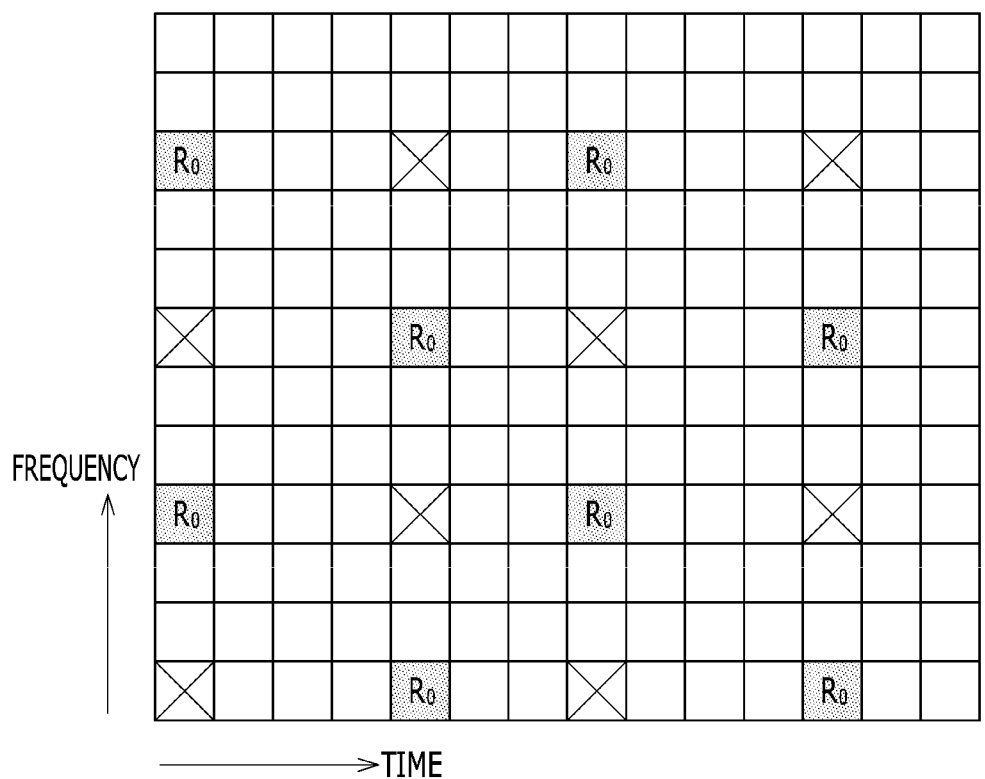
FIG. 3 shows an example of a signal transmitted by a radio unit according to an exemplary embodiment of the present invention.
Figure 4:
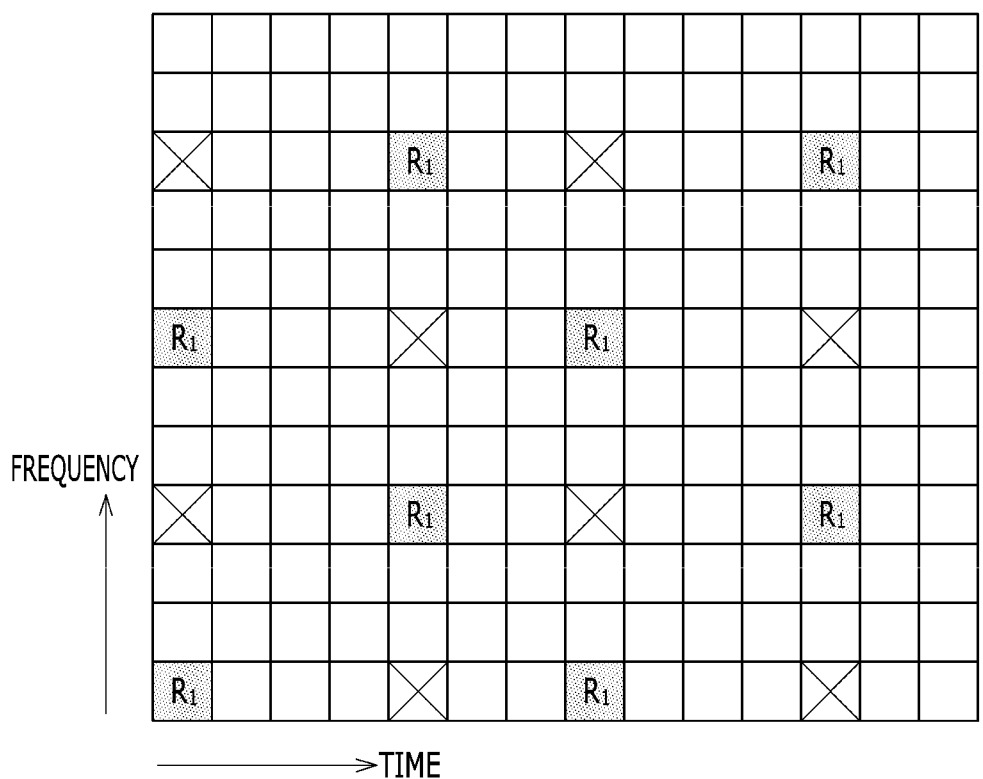
FIG. 4 shows another example of a signal transmitted by a radio unit according to an exemplary embodiment of the present invention.

According to an exemplary embodiment of the present invention, each one of the radio units 111 to 117 and 121 to 127 uses two antennas for supporting 2×2 Multiple Input Multiple Output (MIMO). For the 2×2 MIMO, the radio units 111 to 117 and 121 to 127 have to use a different reference signal pattern for each antenna. For example, when the radio unit 111 includes a first antenna 0 and a second antenna 1, the first antenna 0 may use the reference signal $R_0$ shown in FIG. 3, and the second antenna 1 may use the reference signal $R_1$ shown in FIG. 4. The radio units 111 to 117 included in the same cell 10 use the same reference signal for each antenna. That is, all of the first antennas of the radio units 111 to 117 use the reference signal $R_0$, and all of the second antennas of the radio units 111 to 117 use the reference signal $R_1$. The reference signals $R_0$ and $R_1$ may be transmitted using orthogonal frequency-division multiplexing (hereinafter, referred to as "OFDM") resources, as shown in FIGS. 3 and 4.

Each one of the radio units 111 to 117 included in the same cell 10 may transmit a data signal using the same channel or using different channels. The cooperative radio units 112 to 117 may transmit a data signal using the same channel that the macro radio unit 111 uses.

The positions of reference signals used in each cell may differ according to a physical cell identifier (PCI). That is, subcarriers with reference signals are shifted according to such a PCI as shown in the following [Equation 1].

$$v_{shift} = N_{ID}^{cell} \bmod 6 \qquad \text{[Equation 1]}$$

where $N_{ID}^{cell}$ denotes PCI.

Based on Equation 1, if a PCI is a multiple of 6, the positions of reference signals are as shown in FIG. 3 and FIG. 4.

If a PCI is a multiple of 6 plus 1, the positions of reference signals are shifted up one place. If a PCI is a multiple of 6 plus 2, the positions of reference signals are shifted up two places. If a PCI is a multiple of 6 plus 3, the positions of reference signals are shifted up three places, which are the same as they were when a PCI is a multiple of 6. For example, if neighboring cells have PCIs of 1, 4, and 7, all of the neighboring cells may assign the same reference signal to the same position.

Figure 5:
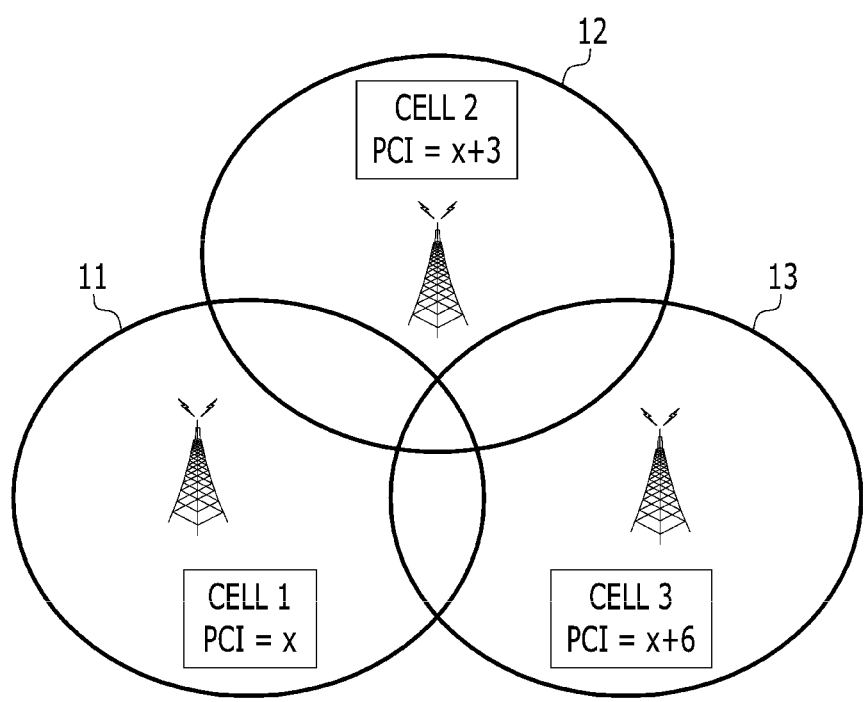
FIG. 5 illustrates a network configuration according to an exemplary embodiment of the present invention.

FIG. 5 illustrates a network configuration according to an exemplary embodiment of the present invention.

Referring to FIG. 5, a network is configured by arranging each cell to have a PCI difference of a multiple of three with a neighboring cell in order to use a diversity technique in a boundary region where different PCIs are used in accordance with at least one embodiment.

That is, if a PCI of a CELL 1 (11) is x, a CELL 2 (12), a neighboring cell of the CELL 1(11), is configured to have a PCI of x+3. Likewise, a CELL 3 (13), a neighboring cell of the CELL 1 (11) and CELL 2(12), is configured to have a PCI of x+6. For example, if the PCI of the CELL 1 (11) is 1, the CELL 2 (12) may be configured to have a PCI of 4 and the CELL 3 (13) may be configured to have a PCI of 7.

When cells are configured to have the multiple 3 of PCI difference with a neighboring cell, the cells may use the same resource element to transmit the same reference signal.

Hereinafter, transmitting a signal to a terminal 410 located in a boundary region 14 between cells 11 and 13 from radio units 111 and 112 of cells 11 and 13, which are configured to have the multiple 3 of PCI difference with a neighboring cell, will be described with reference to FIG. 6.

Figure 6:
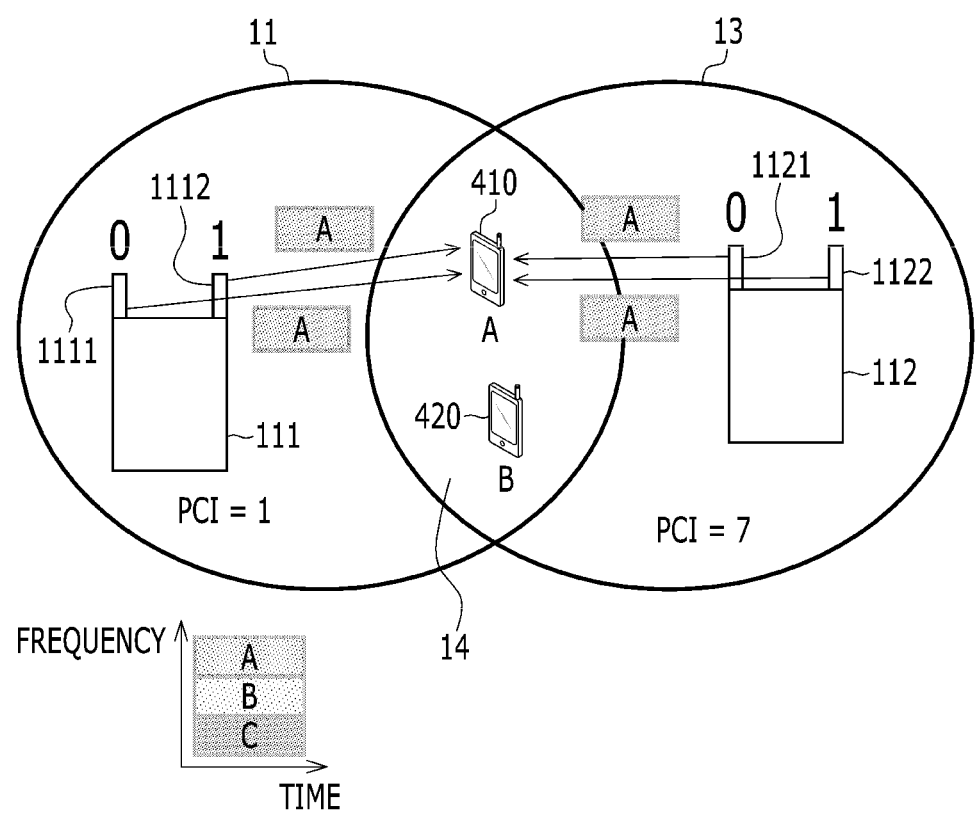
FIG. 6 illustrates radio units transmitting signals to a terminal located in the boundary region between adjacent cells according to an exemplary embodiment of the present invention.

FIG. 6 illustrates radio units transmitting signals to a terminal located in a boundary region of neighboring cells according to an exemplary embodiment of the present invention.

Prior to description, it is to be noted that each of the radio units 111 and 112 according to the exemplary embodiment of the present invention includes two antennas for supporting 2×2 multi-antenna technology and the two antennas use different signal transmission patterns to transmit the same data. That is, it is assumed that the first antenna (indicated as 0) uses a first signal transmission pattern and the second antenna (indicated as 1) uses a second signal transmission pattern.

Referring to FIG. 6, the radio units 111 and 112 are included in the cells 11 and 12, respectively. The radio units 111 and 112 transmit a data signal to a terminal when the terminal is located within a predetermined distance to them. For example, when terminals 410 and 420 are located in the boundary region 14, the terminals 410 and 420 can receive signals from both of the two radio units 111 and 112. In this case, the two radio units 111 and 112 transmit the same data signal to the terminals 410 and 420.

For example, the radio units 111 and 112 transmit the same data signal to the terminal 410 through the same channel A. When the two radio units 111 and 112 transmit the same data to the single terminal 410 through the same channel A, the two radio units 111 and 112 transmit the same data to the terminal 410 through antennas each having a different transmission pattern. For example, the radio unit 111 transmits data having a first transmission pattern to the terminal 410 through the first antenna 1111 using the first transmission pattern, and the radio unit 112 transmits data having a second transmission pattern to the terminal 410 through the second antenna 1122 using the second transmission pattern. For example, the radio unit 111 transmits data having a second transmission pattern to the terminal 410 through the second antenna 1112 using the second transmission pattern, and the radio unit 112 transmits data having a first transmission pattern to the terminal 410 through the first antenna 1121 using the first transmission pattern. That is, the first antenna 1111 of the radio unit 111 and the second antenna 1122 of the radio unit 112 transmit the same data to the terminal 410 through the same channel A, and the second antenna 1112 of the radio unit 111 and the first antenna 1121 of the radio unit 112 transmit the same data to the terminal through the same channel A.

The radio units 111 and 112 use the same reference signal because the PCI difference between the cells 11 and 13 is 6, i.e., a multiple of 3. Also, the radio units 111 and 112 use the same resource element at the same position, other than that occupied by the reference signal, to transmit the same data.

Then, the terminal 410 recognizes signals received through two channels as multichannel signals and combines them and restores the signals.

Figure 8:
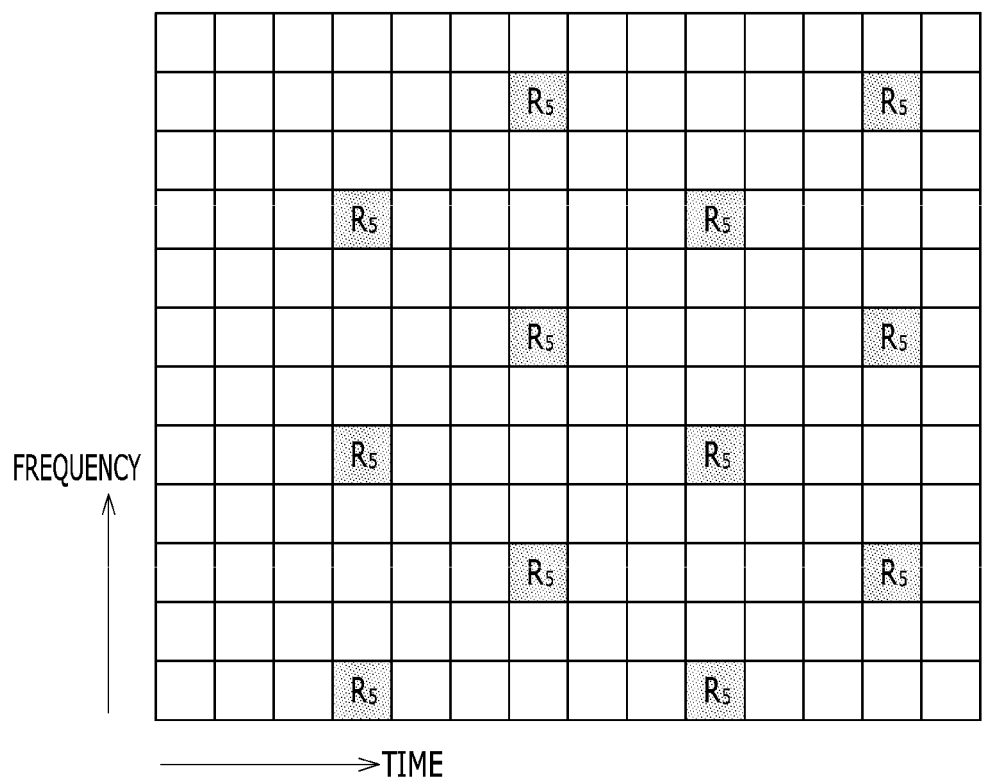
FIG. 8 illustrates user-specific DM-RSs that a digital unit uses to restore signals according to an exemplary embodiment of the present invention.

For signal restoration, neighboring cells transmit user-specific DM-RSs (Demodulation Reference Signals) as shown in FIG. 8, and the terminal 410 restores data signals based on the DM-RSs.

Since the two radio units 111 and 112 use the same reference signal and use the same resource element to transmit the same data to the terminal 410, the quality of data signals received by the terminal 410 can be improved. The data signals from the radio units 111 and 112 may be transmitted using orthogonal frequency-division multiplexing (hereinafter, referred to as "OFDM") resources or wideband code division multiple access (WCDMA) resources.

Hereinafter, a method of determining whether neighboring cells 11 and 13 use the same resource element to transmit the same data to the terminal 410 located in the boundary region 14 will be described.

First, the two radio units 111 and 112 measure the strength of uplink signals received from the terminal 410 and transmit the measurement to the digital unit 200. Then, the digital unit 200 assesses the uplink quality of the terminal 410 based on the signal strength Sa received from the radio unit 111 and the signal strength Sb received from the radio unit 112. That is, if the difference between the signal strength Sa and the signal strength Sb is less than or equal to a threshold Sth as shown in Equation 2, the terminal 410 is determined to be in the boundary region 14.

$$|Sa-Sb| \leq Sth \qquad \text{[Equation 2]}$$

If the difference between the signal strength Sa and the signal strength Sb is greater than or equal to the threshold Sth, the terminal 410 is determined to be in a region other than the boundary region 14. Hence, only the radio unit corresponding to the region where the terminal 410 is located and has higher signal strength, transmits data to the terminal 410.

The threshold Sth may vary as required according to the capacity of a wireless communication system.

When measuring power level is in mW, rather than in dB, and when the ratio of the signal strength Sa received from the radio unit 111 and the signal strength Sb received from the radio unit 112 is as shown in Equation 3, the digital unit 200 assumes that the terminal 410 is in the boundary region 14.

$$T < Sa/Sb < 1/T (0 < T < 1). \qquad \text{[Equation 3]}$$

Once the terminal 410 is determined as located in the boundary region between the cells 11 and 13, the digital unit 200 controls the radio unit 111 of the cell 11 and the radio unit 112 of the cell 13 to use the same resource element to transmit the same data to the terminal 410. The detailed description of a method of the digital unit 200 for controlling the radio units 111 and 112 of the cells 11 and 13 to use the same resource element to transmit the same data will be omitted.

Hereinafter, the digital unit 200 according to the exemplary embodiment of the present invention will be described in detail with reference to FIG. 7.

Figure 7:
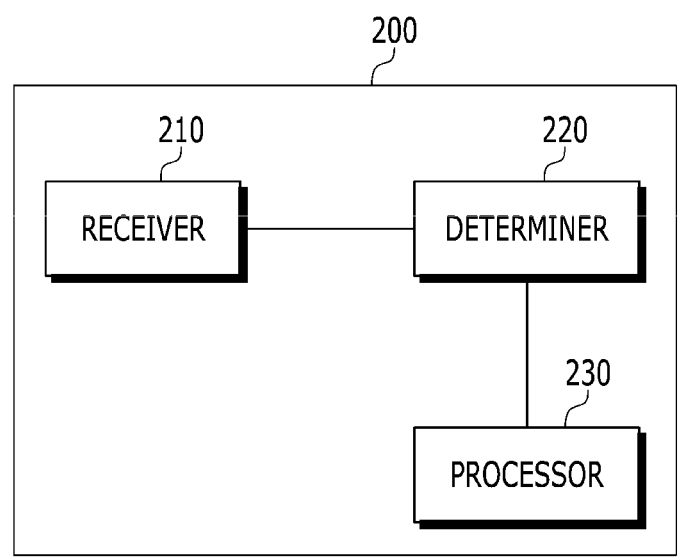
FIG. 7 is a block diagram of a digital unit according to an exemplary embodiment of the present invention.

FIG. 7 is a block diagram of a digital unit according to an exemplary embodiment of the present invention.

Referring to FIG. 7, the digital unit 200 includes a receiver 210, a determiner 220, and a processor 230.

The receiver 210 receives radio signals from the radio units 111 and 112. The radio signals include information on the strength of uplink signals received from the terminal 410 by the radio units 111 and 112.

The determiner 220 determines whether the terminal 410 is located in the boundary region 14 by performing calculation based on the signal strength received by the receiver 210, as shown in Equation 2 or Equation 3.

The processor 230 performs operations for controlling data transfer of the radio units 111 and 112 according to the determination result. Particularly, according to an exemplary embodiment of the present invention, if it is determined that the terminal 410 is located in the boundary region 14 of the radio units 111 and 112, the processor 230 controls the radio unit 111 of the cell 11 and the radio unit 112 of the cell 13 to use the same resource element to transmit the same data to the terminal 410 through the same channel.

As described above, different neighboring cells are configured to use the same reference signal, and different radio units in the neighboring cells use the same resource element to transmit the same data through the same channel to a terminal located in the boundary region of the cells, thereby maximizing the effect of diversity on the terminal in the boundary region and maximizing the performance in the boundary region.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A signal processing system comprising:
   a digital unit connected to a core system and configured to process radio signals; and
   a first cell having a plurality of first radio units adjacent to a second cell having a plurality of second radio units, wherein the first and second radio units are physically isolated from the digital unit and configured to convert and amplify digital signals received from the digital unit, to transmit the amplified signals to a terminal, and to receive uplink signal strength from the terminal and to transmit the same to the digital unit based on a multi-antenna technology, and wherein the digital unit determines whether the terminal is located in the boundary region based on the uplink signal strength of the terminal, and
   wherein one of the first radio units of the first cell and one of the second radio units of the second cell transmit the same reference signal, and one of the first radio units of the first cell and one of the second radio units of the second cell transmit the same data to the terminal using the same channel other than the one occupied by the reference signal when the terminal is located in the boundary region.

2. The signal processing system of claim 1, wherein the reference signal used by the first and second cells is transmitted on the same channel.

3. The signal processing system of claim 1, wherein the difference between a physical cell identifier of the first cell and a physical cell identifier of the second cell is a multiple of three.

4. The signal processing system of claim 1, wherein the terminal is located in the boundary region if the difference between the signal strengths transmitted from the one of the first radio units of the first cell and the signal strength transmitted from the one of the second radio units of the second cell is less than or equal to a predetermined threshold.

5. The signal processing system of claim 1, wherein the terminal is located in the boundary region if the ratio of the signal strengths has a value between a predetermined threshold for the ratio and the reciprocal of the threshold for the ratio.

6. A digital unit for processing radio signals transmitted from a plurality of radio units, wherein the digital unit is physically isolated from the plurality of radio units, and each one of the plurality of radio units uses a multi-antenna technology, the digital unit comprising:
   a receiver configured to receive uplink signal strength transmitted from one of first radio units in a first cell and receive uplink signal strength transmitted from one of second radio units in a second cell, wherein the first cell is adjacent to the second cell;
   a determiner configured to determine whether a terminal is located in a boundary region between the first cell and the second cell based on the received signal strengths; and
   a processor configured to control one of the first radio units of the first cell and one of the second radio units of the second cell to transmit the same reference signal, and configured to control one of the first radio units of the first cell and one of the second radio units of the second cell to transmit the same data to the terminal using the same channel other than the one occupied by the reference signal when the terminal is located in the boundary region.

7. The digital unit of claim 6, wherein the terminal is located in the boundary if the difference between the signal strengths transmitted from the one of the first radio units of the first cell and the signal strength transmitted from the one of the second radio units of the second cell is less than or equal to a predetermined threshold.

8. The digital unit of claim 6, wherein the terminal is located in the boundary if the ratio of the signal strengths has a value between a threshold for the ratio and the reciprocal of the threshold for the ratio.

9. The digital unit of claim 6, wherein the difference between a physical cell identifier of the first cell and a physical cell identifier of the second cell is a multiple of three.

10. The digital unit of claim 6, wherein the plurality of radio units transmit data signals using orthogonal frequency-division multiplexing (hereinafter, referred to as "OFDM") resources or wideband code division multiple access (WCDMA) resources.

11. A method of processing signals by a digital unit, wherein the digital unit is physically isolated from a plurality of radio units, the method comprising:
    receiving radio signals from a plurality of radio units, wherein the plurality of radio units uses multi-antenna technology;
    determining whether a terminal is located in a boundary region of a first cell and a second cell, based on uplink signal strength transmitted from one of first radio units in the first cell and uplink signal strength transmitted from one of second radio units in the second cell, wherein the first cell is adjacent to the second cell; and
    controlling one of the first radio units of the first cell and one of the second radio units of the second cell to transmit the same reference signal, and controlling one of the first radio units of the first cell and one of the second radio units of the second cell to transmit the same data to the terminal using the same channel other than the one occupied by the reference signal when the terminal is located in the boundary region.

12. The signal processing method of claim 11, wherein the terminal is located in the boundary region if the difference between the signal strengths transmitted from the one of the first radio units of the first cell and the signal strength transmitted from the one of the second radio units of the second cell is less than or equal to a threshold.

13. The signal processing method of claim 11, wherein the terminal is located in the boundary region if the ratio of the signal strengths has a value between a threshold for the ratio and the reciprocal of the threshold for the ratio, determining that the terminal is located in the boundary region.

14. The signal processing method of claim 11, wherein the difference between a physical cell identifier of the first cell and a physical cell identifier of the second cell is a multiple of three.

* * * * *